United States Patent
Kim et al.

(10) Patent No.: US 10,222,650 B2
(45) Date of Patent: Mar. 5, 2019

(54) SIDE LIGHT-EMITTING TYPE DISPLAY DEVICE HAVING FRAME MEMBER

(71) Applicants: Sug Bae Kim, Daegu (KR); Jin Soo Nam, Daegu (KR); Hong Ki Ha, Daegu (KR); Sun Mi Kim, Daegu (KR); Jong Ho Kim, Daegu (KR)

(72) Inventors: Sug Bae Kim, Daegu (KR); Jin Soo Nam, Daegu (KR); Hong Ki Ha, Daegu (KR); Sun Mi Kim, Daegu (KR); Jong Ho Kim, Daegu (KR)

(*) Notice: Subject to any disclaimer, the term of this patent is extended or adjusted under 35 U.S.C. 154(b) by 0 days.

(21) Appl. No.: 15/568,619

(22) PCT Filed: Apr. 21, 2016

(86) PCT No.: PCT/KR2016/004187
§ 371 (c)(1),
(2) Date: Oct. 23, 2017

(87) PCT Pub. No.: WO2016/171501
PCT Pub. Date: Oct. 27, 2016

(65) Prior Publication Data
US 2018/0157119 A1  Jun. 7, 2018

(30) Foreign Application Priority Data
Apr. 24, 2015 (KR) .................. 10-2015-0058245

(51) Int. Cl.
*G02F 1/133* (2006.01)
*G02F 1/1335* (2006.01)
(Continued)

(52) U.S. Cl.
CPC ...... *G02F 1/133608* (2013.01); *G02F 1/1333* (2013.01); *G02F 1/133308* (2013.01);
(Continued)

(58) Field of Classification Search
None
See application file for complete search history.

(56) References Cited

U.S. PATENT DOCUMENTS

| | | | |
|---|---|---|---|
| 2009/0059618 A1* | 3/2009 | Onikiri ............... | G02B 6/0053 362/603 |
| 2013/0076649 A1* | 3/2013 | Myers ................ | H04M 1/0268 345/173 |

(Continued)

FOREIGN PATENT DOCUMENTS

| KR | 10-2005-0045056 A | 5/2005 |
|---|---|---|
| KR | 1020060092936 | 8/2006 |

(Continued)

OTHER PUBLICATIONS

International Search Report for PCT/KR2016/004187, filed Apr. 21, 2016.

*Primary Examiner* — James Dudek
(74) *Attorney, Agent, or Firm* — Schmeiser, Olsen & Watts, LLP

(57) ABSTRACT

Provided is a side light-emitting type display device having a frame member. The side light-emitting display device having a frame member includes a display assembly configured to guide light to a side surface of the display assembly while displaying an image using light emitted from light sources; a transparent frame member which is configured to surround and fix the display assembly and through which the light guided to the side surface of the display assembly is transmitted; and a side display member provided on a side surface of the transparent frame member, and configured to display information of the image using the light guided to the side surface of the display assembly.

10 Claims, 8 Drawing Sheets

(51) Int. Cl.
    *G02F 1/1333*    (2006.01)
    *G09F 9/35*    (2006.01)
    *G09F 13/04*    (2006.01)
    *G09F 13/14*    (2006.01)
    *G09F 13/18*    (2006.01)
    *G09G 3/36*    (2006.01)
    *G09G 3/34*    (2006.01)

(52) U.S. Cl.
    CPC .. *G02F 1/133605* (2013.01); *G02F 1/133606* (2013.01); *G02F 1/133615* (2013.01); *G09F 9/35* (2013.01); *G09F 13/0409* (2013.01); *G09F 13/0413* (2013.01); *G09F 13/14* (2013.01); *G09F 13/18* (2013.01); *G02F 2001/133342* (2013.01); *G02F 2202/28* (2013.01); *G02F 2203/01* (2013.01); *G09F 2013/049* (2013.01); *G09F 2013/1854* (2013.01); *G09F 2013/1881* (2013.01); *G09G 3/3406* (2013.01); *G09G 3/36* (2013.01)

(56) References Cited

U.S. PATENT DOCUMENTS

2015/0062460 A1*    3/2015   Yamada ................. G06F 3/041
                                                                                         349/12
2015/0177554 A1*    6/2015   Li ..................... G02F 1/133308
                                                                                         349/58

FOREIGN PATENT DOCUMENTS

| KR | 10-2008-0006057 A | 1/2008 |
| KR | 10-2010-0112025 A | 10/2010 |
| KR | 10-2010-0120258 A | 11/2010 |
| KR | 10-2012-0117174 A | 10/2012 |

* cited by examiner

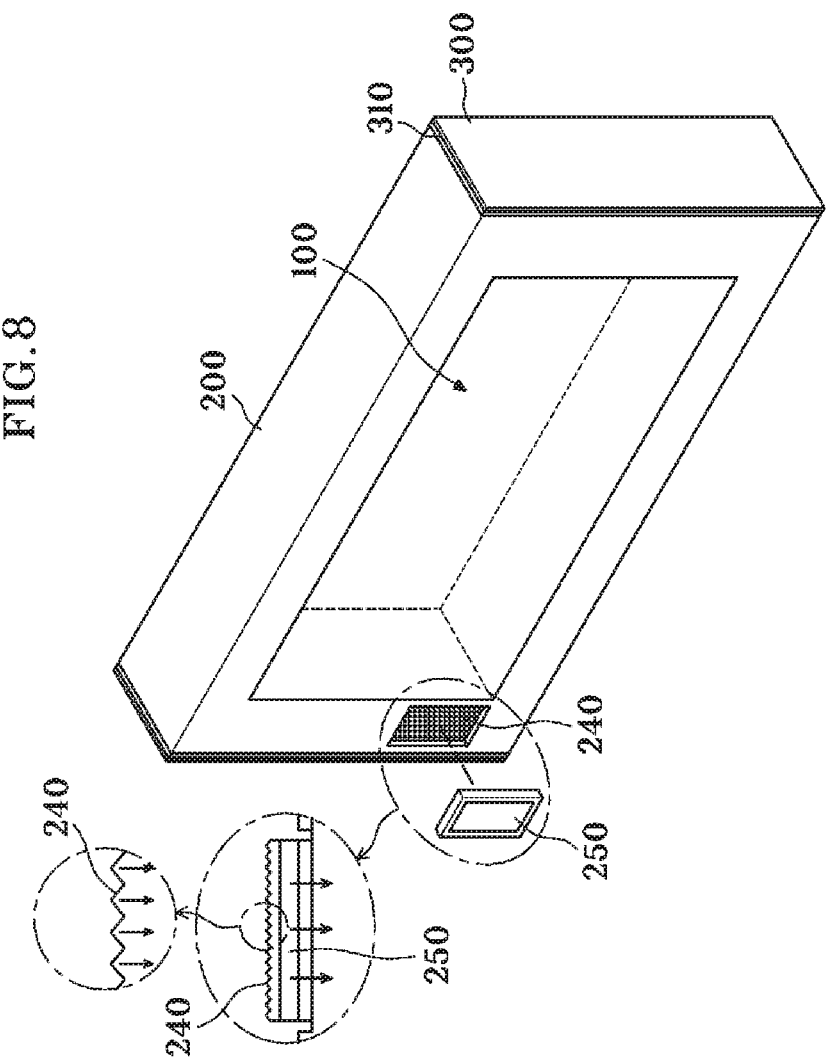

SIDE LIGHT-EMITTING TYPE DISPLAY DEVICE HAVING FRAME MEMBER

CROSS-REFERENCE TO RELATED APPLICATIONS

This application claims priority to PCT Application No. PCT/KR2016/004187 having a filing date of Apr. 21, 2016, based off of Korean Patent Application No. 10-2015-0058245, having a filing date of Apr. 24, 2015, the entire contents of all which are hereby incorporated by reference.

FIELD OF TECHNOLOGY

The following relates to a side light-emitting type display device having a frame member, and more particularly, to a side light-emitting display device having a frame member, in which four sides of a display assembly are fixed with a transparent frame member and light emitted from the display assembly is guided to a side surface of the transparent frame member to display an image using a side display member, thereby efficiently utilizing the side surface of the transparent frame member.

BACKGROUND

Generally, a display device is an image display device on which various images may be displayed by forming an image on a liquid crystal panel using light emitted from light sources.

Existing display devices are used in various signs such as advertising signs, guide signs, traffic signs, etc. for announcement, promotion, guidance, and information purposes for urban residents.

A display device employs various types of surface light source generating devices using an illumination device such as a light projector or a fluorescent lamp to enhance readability during the low visibility of nighttime. Examples of a surface light source generating device include a surface light source-generating device using a fluorescent lamp, and a surface light source-generating device which is applicable to an LCD liquid crystal panel and employs an illuminant such as a lamp.

The surface light source generating device using a fluorescent lamp is configured to generate a surface light source using a plurality of fluorescent lamps spaced apart at certain intervals in an advertising sign formed of an opaque acrylic material, and illuminate letters and designs formed on a front surface of the advertising sign with the surface light source.

The surface light source generating device applicable to an LCD TV is configured such that, when an illuminant such as a lamp located at each side of a fixing frame supporting an LCD liquid crystal panel emits light, the light is diffusely reflected via a light guide panel of a backlight unit (BLU) to generate a surface light source, and the surface light source emits light to a still or moving image shown on the LCD liquid crystal panel to make the still or moving image bright.

In a conventional display device, a case is provided around a display device to fix a display assembly for forming an image. However, since the case is formed of an opaque material, light generated from a surface light generating device of the display assembly cannot be guided to a side surface of the display device. Therefore, since an image is displayed on a front or rear surface of the display device but cannot be displayed on side surfaces of the display device, the side surfaces of the display device cannot used for advertisement.

Furthermore, existing conventional display device includes a thin-film transistor (TFT) liquid crystal panel, a straight member (BF), a diffusion film, a backlight element, a reflector, etc., and these five components are coupled to one another using a bezel (a front case) and a rear case. Thus, the thickness, weight, and manufacturing cost of the display device increase.

Accordingly, there is a need for resolving such problems.

SUMMARY

An aspect relates to a side light-emitting type display device having a frame member, in which four sides of a display assembly are fixed with a transparent frame member and light emitted from the display assembly is guided to a side surface of the transparent frame member to display an image using a side display member, thereby efficiently utilizing the side surface of the transparent frame member.

Embodiments of the present invention are also directed to a side light-emitting type display device having a frame member, in which a display assembly is inserted into an installation hole of a transparent frame member and is integrally fixed with the transparent frame member using epoxy, resin, or the like to provide rigidity to the display device, thereby preventing the display device from being twisted or bent. Thus, a bezel (a front case) employed in the related art may be omitted and the thickness, weight, and manufacturing cost of the display device may be reduced.

According to one aspect of embodiments of the present invention, a side light-emitting type display device having a frame member includes a display assembly configured to guide light to a side surface of the display assembly while displaying an image using light emitted from light sources; a transparent frame member which is configured to surround and fix the display assembly, and through which the light guided to the side surface of the display assembly is transmitted; and a side display member provided on a side surface of the transparent frame member and configured to display information of the image using the light guided to the side surface of the display.

The display assembly may include a reflecting part configured to reflect light emitted from the light sources; and a display configured to display an image using the light reflected by the reflecting part.

The light sources may be integrally fixed by a light source fixing unit.

The light source fixing unit may include a transparent case having an opening of which a side is open; light source mounting members arranged in the opening of the transparent case at predetermined intervals, wherein a plurality of light sources are provided on the light source mounting members in a longitudinal direction; and a transparent material injected in a liquid form into the opening and then solidified, the transparent material being configured to integrally fix the light sources and the light source mounting members.

The light sources may be edge-type light sources included in an upper or lower part of the transparent frame member.

The transparent frame member may use the light guided to the side surface of the display assembly as backlight of the side display member.

An installation hole corresponding to an outer diameter of the display assembly may be formed in the transparent frame member, and the display assembly may be inserted into the installation hole and then fixed into the transparent frame member by applying a transparent adhesive on an outer edge of the display assembly.

A light amplification inducing unit may be buried in the transparent frame member to efficiently guide light in a lateral direction of a side of the display assembly.

A scratch part may be formed on a predetermined area of a front surface of the transparent frame member, and a small-sized liquid crystal panel may be mounted in the scratch part to display a small image using light guided from the light sources to the transparent frame member.

The side display member may be a liquid crystal panel or a transparent or semitransparent panel on which an advertisement design is drawn, and a diffusion film may be further provided on a rear surface of the side display member.

In a side light-emitting type display device having a frame member according to embodiments of the present invention, four sides of a display assembly may be fixed with a transparent frame member and light emitted from the display assembly may be guided to a side surface of the transparent frame member to display an image using a side display member, thereby efficiently utilizing the side surface of the transparent frame member.

According to embodiments of the present invention, the display assembly may be inserted into an installation hole of the transparent frame member and integrally fixed with the transparent frame member using epoxy, resin, etc. to provide rigidity to the display assembly, thereby preventing the display assembly from being twisted or bent. Thus, a bezel (a front case) employed in the related art may be omitted, and the thickness, weight, and manufacturing cost of the side light-emitting display device may be reduced in embodiments of the present invention.

According to embodiments of the present invention, light sources may be conveniently and easily fixed using a light source fixing unit.

Furthermore, according to embodiments of the present invention, the transparent frame member may include a light amplification inducing unit to increase brightness of an image displayed on the side display member.

In addition, according to embodiments of the present invention, a scratch part may be formed on a front or rear surface of the transparent frame member, and a small-sized liquid crystal panel may be mounted in the scratch part to display a small image separate from a display part.

BRIEF DESCRIPTION

Some of the embodiments will be described in detail, with reference to the following figures, wherein like designations denote like members, wherein.

Figure 7:
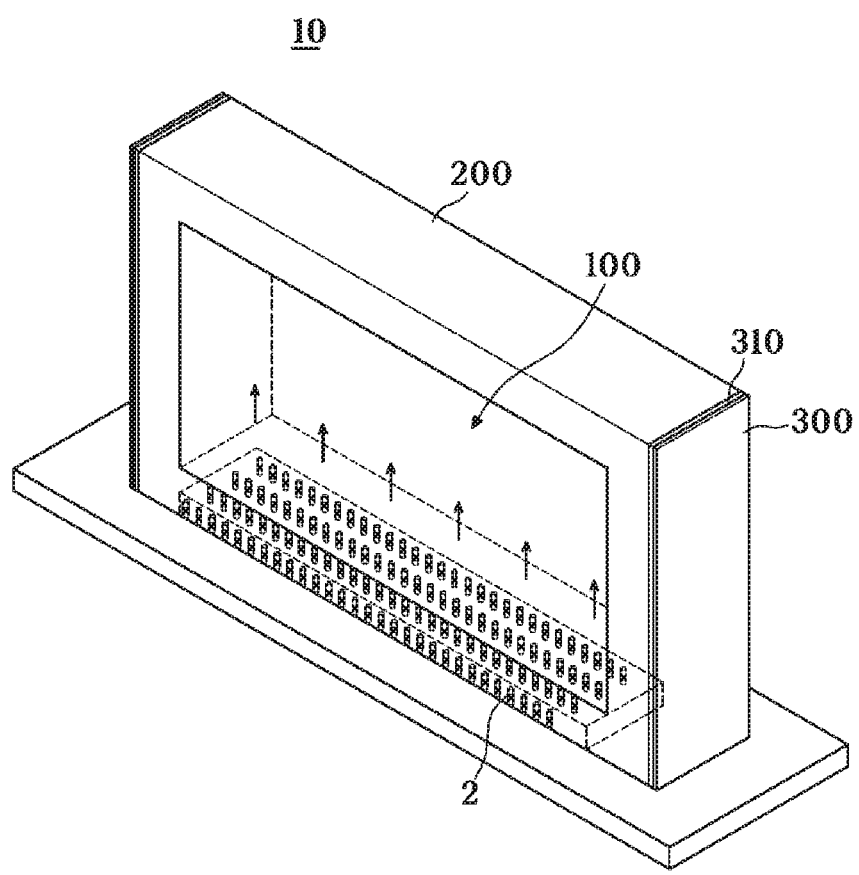

FIG. 7 is a cross-sectional view illustrating a state in which an edge-type light source is employed in a side light-emitting display device having a frame member according to an embodiment of the present invention; and FIG. 8 is a perspective view in which a small-sized liquid crystal panel is installed in a scratch part formed on a front surface of a transparent frame member according to an embodiment of the present invention.

DETAILED DESCRIPTION

In the description, the thicknesses of lines or the sizes of components illustrated in the drawings may be exaggerated for clarity and convenience of description. Furthermore, terms used herein are defined by taking into account functions of embodiments of the present invention, and the meanings thereof may vary depending on a user or operator's intentions or precedents. Accordingly, the terms used herein should be defined on the basis of the whole context of embodiments of the present invention.

Figure 1:
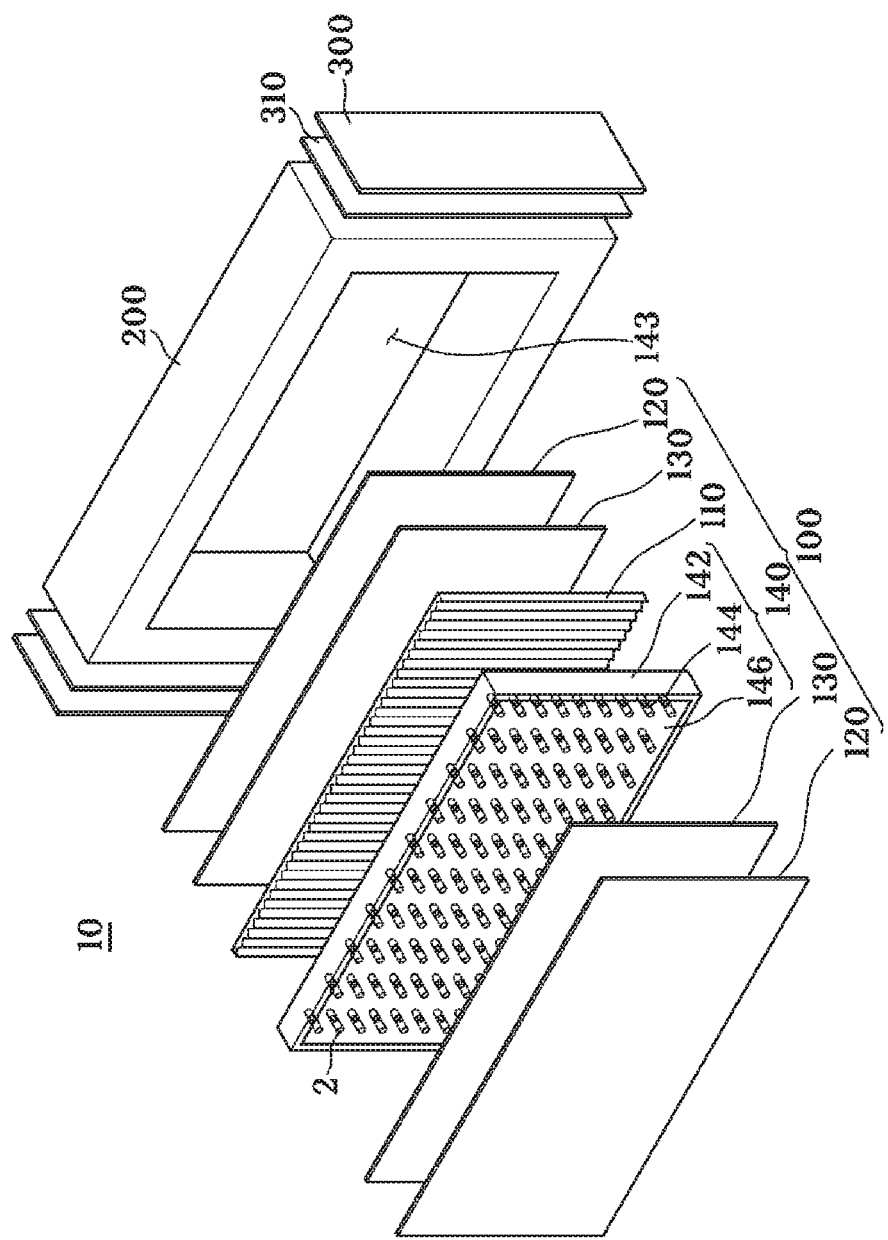
FIG. 1 is an exploded perspective view of a side light-emitting display device having a frame member, according to an embodiment of the present invention.
Figure 2:
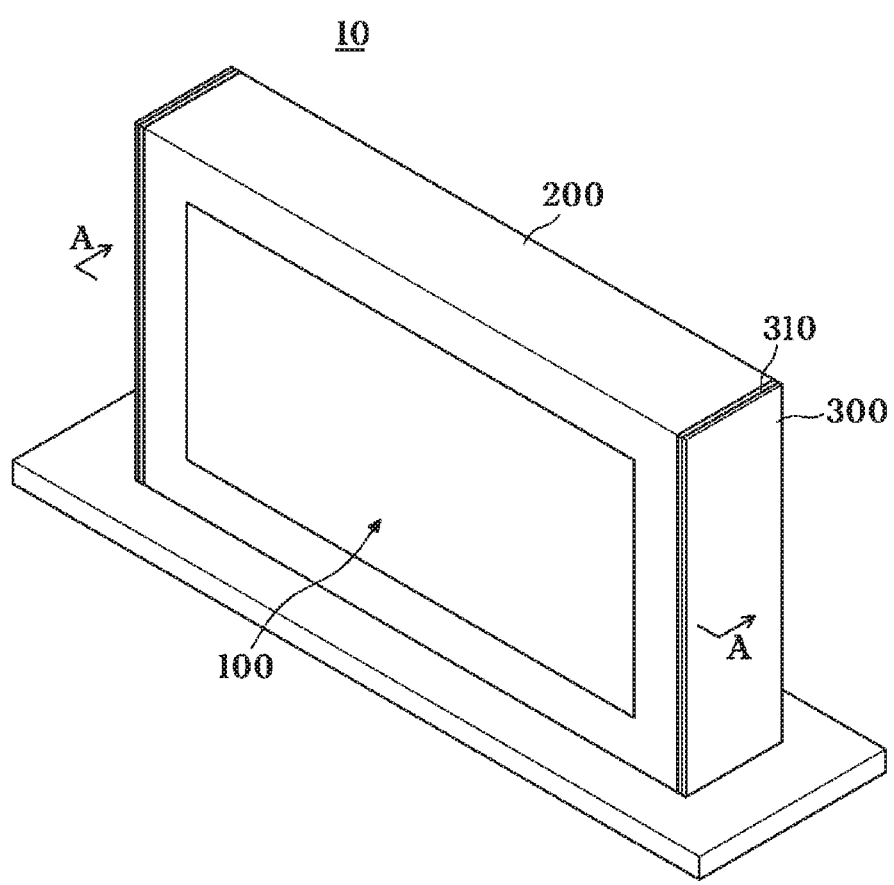
FIG. 2 is an assembled perspective view of a side light-emitting display device having a frame member according to an embodiment of the present invention.
Figure 3:
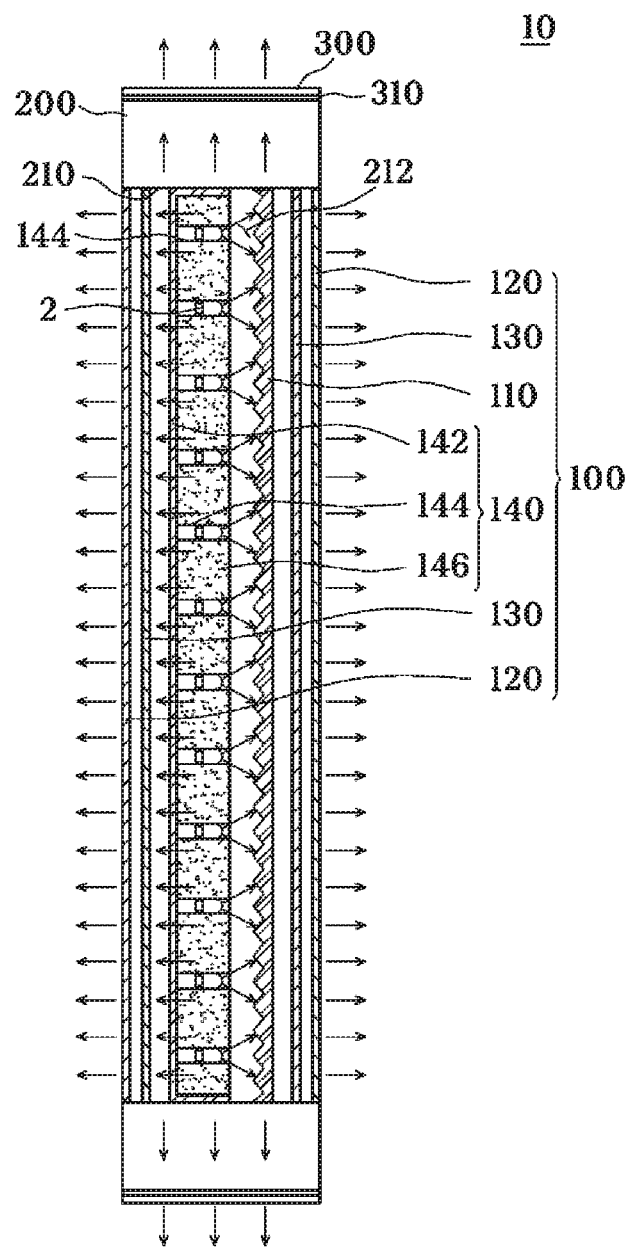
FIG. 3 is an assembled cross-sectional view taken along line A-A of FIG. 2.
Figure 4:
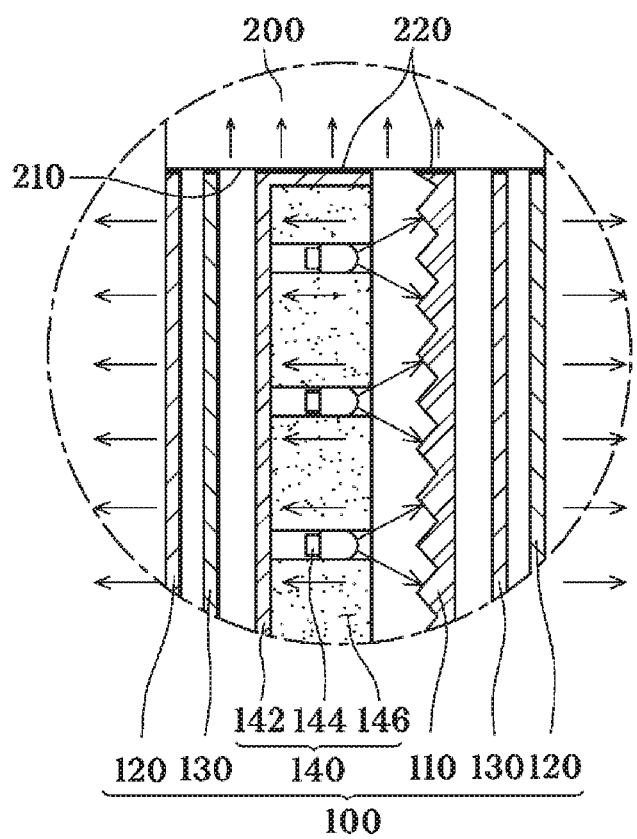
FIG. 4 is an expanded cross-sectional view of a display assembly and a frame member combined according to an embodiment of the present invention.

FIG. 1 is an exploded perspective view of a side light-emitting display device having a frame member according to an embodiment of the present invention. FIG. 2 is an assembled perspective view of a side light-emitting display device having a frame member according to an embodiment of the present invention. FIG. 3 is an assembled cross-sectional view taken along line A-A of FIG. 2. FIG. 4 is an expanded cross-sectional view of a display assembly and a transparent frame member combined according to an embodiment of the present invention.

Figure 5:
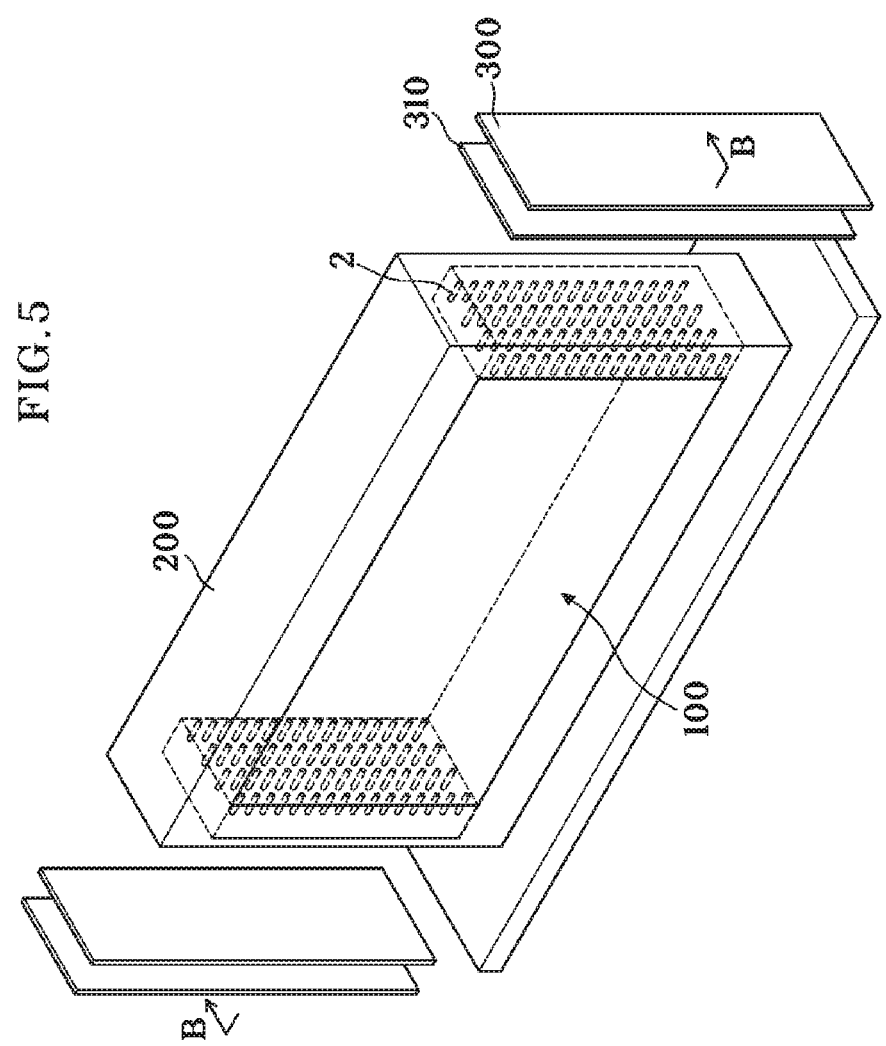
FIG. 5 is a perspective view illustrating a state in which a light amplification inducing unit is embedded in a transparent frame member according to an embodiment of the present invention.
Figure 6:
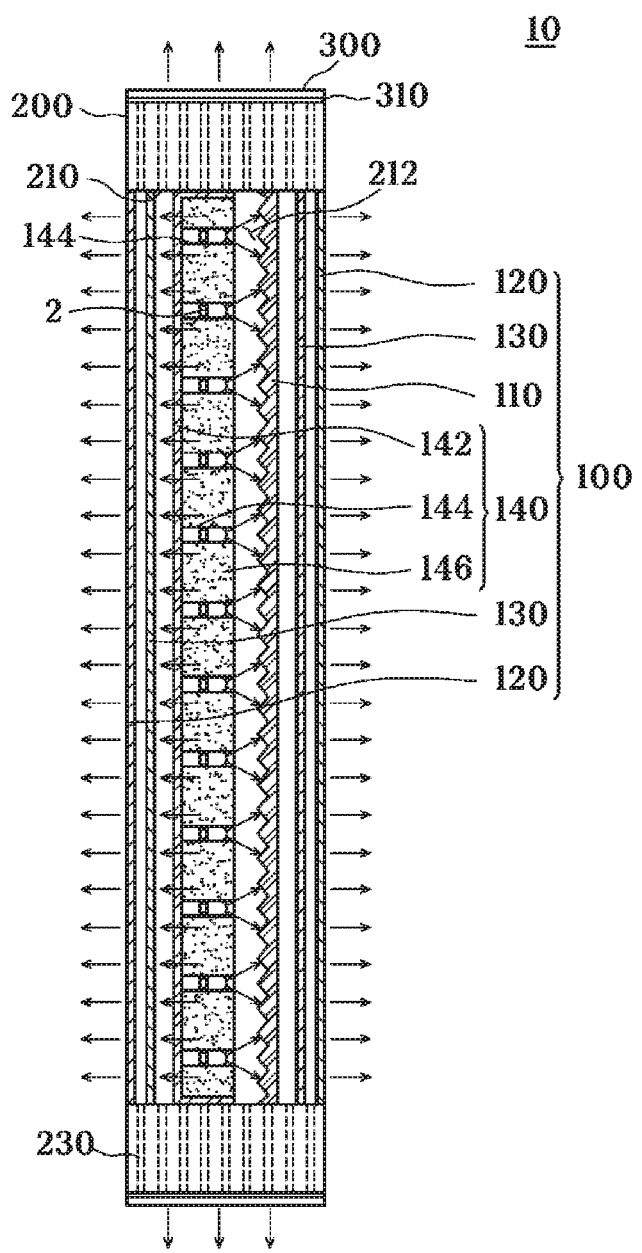
FIG. 6 is an assembled cross-sectional view taken along line B-B of FIG. 5.

FIG. 5 is a perspective view illustrating a state in which a light amplification inducing unit is embedded in a transparent frame member according to an embodiment of the present invention. FIG. 6 is an assembled cross-sectional view taken along line B-B of FIG. 5. FIG. 7 is a cross-sectional view illustrating a state in which an edge-type light source is employed in a side light-emitting display device having a frame member according to an embodiment of the present invention. FIG. 8 is a perspective view illustrating a state in which a small-sized liquid crystal panel is installed in a scratch part formed on a front surface of a transparent frame member according to an embodiment of the present invention.

Referring to FIGS. 1 to 8, a side light-emitting type display device 10 having a frame member according to an embodiment of the present invention includes a display assembly 100, a transparent frame member 200, and a side display member 300.

The display assembly 100 is configured to form an image using light emitted from light sources 2 and guide the light to a side surface of the display device 10. The light sources 2 employed in the display assembly 100 may be direct-type surface light sources formed by arranging a plurality of point light sources such as light-emitting diodes (LEDs) or the like in the display assembly 100 to directly emit and diffusely reflect light to make a surface light source, or may be edge-type surface light sources formed by embedding the light sources 2 in a lower part of the transparent frame member 200 as illustrated in FIG. 7 to emit light in a direction toward a side of the display assembly 100 (an upward direction in the drawing) and diffusely reflect the light to make a surface light source.

FIGS. 1 through 6 illustrate a direct-type display device according to embodiments of the invention. FIG. 7 illustrates an edge-type display device according to embodiments of the invention. However, the display devices are only examples, and both a direct-type light source and an edge-type light source are applicable to embodiments of the present invention.

When a reflecting part 110 which will be described later is semi-transparent, the display assembly 100 may emit light from the light sources 2 in all directions, e.g., towards a front surface, a rear surface, and side surfaces of the display device 10, by diffusely reflecting and emitting some of the light to the front surface of the display assembly 100, diffusely reflecting and emitting some of the light to be transmitted to the rear surface thereof, and emitting some of the light to the side surfaces thereof.

The display assembly 100 includes the reflecting part 110 and a display part 120.

The reflecting part 110 is configured to reflect light emitted from the light sources 2. The reflecting part 110 is a reflector in which V-shaped irregularities are repeatedly formed. The reflecting part 110 may be a full-reflector which reflects light only toward a front surface of the display assembly 100, or a reflector formed of a semitransparent material and configured to reflect some of the light toward the front surface of the display assembly 100 and transmit some of the light to a rear surface of the display assembly 100.

That is, when the reflecting part 110 is a full-reflector, light is reflected only toward the front and side surfaces of the display assembly 100. When the reflecting part 110 is a semitransparent reflector, light is guided by being reflected and transmitted in all directions, e.g., toward the front surface, the rear surface, and the side surfaces of the display assembly 100. In the drawings of embodiments of the present invention, a case in which the reflecting part 110 which is a semitransparent reflector guides light by reflecting and transmitting the light in all directions, e.g., toward the front, rear, and side surfaces of the display assembly 100 is illustrated.

The display part 120 displays an image using light reflected by the reflecting part 110.

The display part 120 is arranged on at least one of the front surface and the rear surface of the display assembly 100 to be spaced apart from the reflecting part 110 to form a space between the display part 120 and the reflecting part 110, and displays an image using light reflected by the reflecting part 110.

A liquid crystal panel is preferably employed in the display part 120. In some embodiments, the display part 120 may be used for an advertising sign, a guide sign, or a traffic sign which includes letters or designs. The display part 120 may be configured such that letters or designs are engraved on light-transmissive acrylic resin.

A diffusion member 130 may be provided between the reflecting part 110 and the display part 120.

The diffusion member 130 may include a diffusion film for widely diffusing light such that the light sources 2 which are in the form of a plurality of dots cannot be seen.

Referring to FIGS. 1, 3, and 4, the light sources 2 are integrally fixed by the light source fixing unit 140.

With the light source fixing unit 140, a plurality of light sources 2, which are of an LED type, may be arranged at predetermined intervals and integrally fixed to make one light source so that the plurality of light sources 2 may be easily assembled into an installation hole 210 of the transparent frame member 200.

The light source fixing unit 140 includes a transparent case 142, light source mounting members 144, and a transparent material 146.

The transparent case 142 includes an opening 143 which opens a side of thereof. The transparent case 142 is an empty rectangular case having the opening 143 which opens a front or rear surface thereof. The transparent case 142 may be formed of a transparent plastic material such as acrylic resin or a transparent glass material.

The light source mounting members 144 are arranged in the opening 143 of the transparent case 142 at predetermined intervals, and a plurality of light sources 2 are provided in a longitudinal direction. The light source mounting members 144 may be a flexible printed circuit board (FPCB). Any support structures in which the light sources 2 may be mounted may be used as the light source mounting members 144.

A plurality of light source mounting members 144 may be arranged at predetermined intervals in a horizontal direction, and a plurality of light sources 2 may be arranged in each of the plurality of light source mounting members 144 at predetermined intervals in a longitudinal direction. Thus, the light sources 2 may be arranged in the display assembly 100 at uniform intervals to uniformly and effectively emit light.

The light sources 2 arranged on the light source mounting members 144 may emit light in a rear direction, and the reflecting part 110 arranged on the rear surface of the display assembly 100 may reflect some of the light toward the front surface of the display assembly 100, transmit some of the light to the rear surface of the display assembly 100, and reflect some of the light to side surfaces of the display assembly 100, thereby guiding the light in all directions.

The transparent material 146, which is in a liquid form, is injected into the opening 143 and is then solidified to integrally fix the light sources 2 and the plurality of light source mounting members 144. The transparent material 146 is preferably resin. However, any material that is in a liquid form and solidifies after a certain amount of time and has a transparent property may be used as the transparent material 146.

The transparent material 146 is injected into the opening 143 so as to become level with the edges of transparent case 142 and planarize opposite surfaces of the light source fixing unit 140. Accordingly, light reflected by the reflecting part 110 may propagate in a straight direction.

The transparent frame member 200 is configured to surround and fix the display assembly 100, and guide light to a side surface of the display assembly 100. The installation hole 210 is formed at a middle part of an integral type tetragonal frame of the transparent frame member 200 to pass through the front and rear surfaces of the transparent frame member 200.

The transparent frame member 200 may be formed of an acryl material or a tempered glass material.

The transparent frame member 200 uses light guided to the side surface of the display assembly 100 as a backlight of the side display member 300.

The installation hole 210 corresponding to an outer diameter of the display assembly 100 is formed in the transparent frame member 200.

Referring to FIG. 4, the display assembly 100 is inserted into the installation hole 210 and is then fixed into the transparent frame member 200 by applying a transparent adhesive 220 on an outer edge of the display assembly 100. Any adhesive in a liquid form and capable of maintaining a transparent state when solidified may be used as the transparent adhesive 220. The transparent adhesive 220 may be resin.

After the display assembly 100 is inserted into the installation hole 210 of the transparent frame member 200, the display assembly 100 is integrally fixed with the transparent frame member 200 using epoxy, resin, or the like to provide rigidity to the display assembly 100. Thus, the display assembly 100 may be prevented from being twisted or bent.

Thus, the thickness, weight, and manufacturing cost of the side light-emitting display device 10 according to embodiments of the present invention may be reduced.

Referring to FIGS. 5 and 6, the light amplification inducing unit 230 may be embedded in the transparent frame member 200 to efficiently guide light in a lateral direction.

At least one of an optical cable and an optical pipe may be used as the light amplification inducing unit 230. The light amplification inducing unit 230 is coupled to an inner side surface of the installation hole 210 of the transparent frame member 200 in the lateral direction, and is thus exposed on the perimeter of the frame member 200. Thus, the side display member 300 may use the light amplification inducing unit 230 as an amplified surface light source to display an image with high brightness. Any component that may amplify light, such as a cable, an optical pipe, etc., may be used as the light amplification inducing unit 230.

The light sources 2 may be edge-type light sources included in an upper or lower side of the transparent frame member 200.

FIG. 7 illustrates a state in which the edge-type light sources 2 are embedded in a lower part of the transparent frame member 200 and emit light in an upward direction, and the light is reflected by the reflecting part 110 of the display assembly 100 onto the front, rear, and side surfaces of the display assembly 100.

Referring to FIG. 8, a scratch part 240 may be formed on a predetermined area of a front surface of the transparent frame member 200.

The scratch part 240 is formed on the predetermined area using sandpaper or the like.

An image may be displayed by mounting a small liquid crystal panel 250 in the scratch part 240, reflecting light guided to the transparent frame member 200 through refraction by the scratch part 240, and using the reflected light as a surface light source of the small liquid crystal panel 250.

That is, the scratch part 240 may be formed on the predetermined area using sandpaper or the like, and light propagating straight to a side surface of the frame member 200 may be guided to be refracted at an angle of 90 degrees by the scratch part 240 so as to use the light as a surface light source.

The scratch part 240 may be letters or figures used for the logo of a manufacturing company or the name of a product, or for advertisement. In this case, the small liquid crystal panel 250 is not mounted in the scratch part 240, and only the scratch part 240 is used.

When the display part 120 of the display assembly 100 has a large screen size of 100 inches or more, an image may not be able to be viewed while close to the display assembly 100, and thus the scratch part 240 may be formed on the transparent frame member 200 and the small liquid crystal panel 250 may be mounted into the scratch part 240 to display the image on a smaller screen via the small liquid crystal panel 250.

Alternatively, an image displayed on the small liquid crystal panel 250 may be different from that displayed on the display part 120.

The side display member 300 is provided on a side surface of the transparent frame member 20 to display information of an image using light guided to a side surface of the display assembly 100.

The side display member 300 may be a liquid crystal panel, a TFT-liquid crystal panel, or a transparent or semi-transparent panel on which an advertisement design is drawn.

The diffusion film 310 is further provided on a rear surface of the side display member 300 so that an image displayed on the side display member 300 may be widely expanded to be clearly viewed.

The side display member 300 may be fixed onto a side surface of the transparent frame member 200 using a transparent adhesive or may be fixed in other various ways.

Accordingly, in a side light-emitting type display device having a frame member according to an embodiment of the present invention, four sides of a display assembly are fixed with a transparent frame member, and light emitted from the display assembly is guided to a side surface of the transparent frame member so as to display an image using a side display member. Thus, the side surface of the transparent frame member may be efficiently used.

In embodiments of the present invention, after the display assembly is inserted into an installation hole of the transparent frame member, the display assembly is integrally fixed thereto using epoxy, resin, etc. to provide rigidity to the display assembly, thereby preventing the display assembly from being twisted or bent. Thus, a bezel (a front case) employed in the related art may be omitted, and the thickness, weight, and manufacturing cost of the side light-emitting display device according to embodiments of the present invention may be reduced.

Furthermore, in embodiments of the present invention, a light source may be conveniently and easily fixed using a light source fixing unit. In embodiments of the present invention, the transparent frame member includes a light amplification inducing unit to increase the brightness of an image displayed on the side display member. In addition, in embodiments of the present invention, a scratch part may be formed on a front or rear surface of the transparent frame member, and a small liquid crystal panel may be mounted into the scratch part to display a small image separate from a display part.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The claims are as follows:

1. A side light-emitting type display device, comprising:
a display assembly configured to guide light to a side surface of the display assembly while displaying a first image using light emitted from light sources;
a transparent frame member configured to surround and fix the display assembly, and through which the light guided to the side surface of the display assembly is transmitted; and
a side display member provided on a side surface of the transparent frame member, and configured to display information of the first image using the light guided to the side surface of the display assembly;
wherein the light sources are integrally fixed by a light source fixing unit comprising a transparent case having an opening that opens a side of the transparent case, and light source mounting members arranged in the opening of the transparent case at predetermined intervals, wherein a plurality of light sources are provided on the light source mounting members, and a transparent material injected in a liquid form into the opening, wherein the transparent material is then solidified, the solidified transparent material integrally fixing the light sources and the light source mounting members.

2. The side light-emitting type display device of claim 1, wherein the display assembly comprises:
   a reflecting part configured to reflect light emitted from the light sources; and
   a display configured to display the first image using the light reflected by the reflecting part.

3. The side light-emitting type display device of claim 1, wherein the light sources are edge-type light sources included in at least one of an upper and a lower part of the transparent frame member.

4. The side light-emitting type display device of claim 2, wherein the transparent frame member uses the light guided to the side surface of the display assembly as a backlight of the side display member.

5. The side light-emitting type display device of claim 2, wherein an installation hole corresponding to an outer diameter of the display assembly is formed in the transparent frame member, and
   the display assembly is inserted into the installation hole, and then fixed to the transparent frame member by applying a transparent adhesive on an outer edge of the display assembly.

6. The side light-emitting type display device of claim 2, wherein a light amplification inducing unit is embedded in the transparent frame member to efficiently guide light in the display assembly.

7. The side light-emitting type display device of claim 2, wherein a scratch part is formed on an area of a front surface of the transparent frame member, and a liquid crystal panel is mounted on the scratch part to display a second image using light guided from the light sources to the transparent frame member.

8. The side light-emitting type display device of claim 1, wherein the side display member is a liquid crystal panel or a transparent or semitransparent panel on which an advertisement design is drawn, and wherein a diffusion film is further provided on a rear surface of the side display member.

9. A side light-emitting type display device, comprising:
   a display assembly configured to guide light to a side surface of the display assembly while displaying a first image using light emitted from light sources;
   a transparent frame member configured to surround and fix the display assembly, and through which the light guided to the side surface of the display assembly is transmitted; and
   a side display member provided on a side surface of the transparent frame member, and configured to display information of the first image using the light guided to the side surface of the display assembly;
   wherein the light sources are edge-type light sources included in at least one of an upper and a lower part of the transparent frame member.

10. A side light-emitting type display device, comprising:
   a display assembly configured to guide light to a side surface of the display assembly while displaying a first image using light emitted from light sources;
   a transparent frame member configured to surround and fix the display assembly, and through which the light guided to the side surface of the display assembly is transmitted; and
   a side display member provided on a side surface of the transparent frame member, and configured to display information of the first image using the light guided to the side surface of the display assembly;
   wherein the display assembly comprises a reflecting part configured to reflect light emitted from the light sources, and a display configured to display the first image using the light reflected by the reflecting part;
   wherein a light amplification inducing unit is embedded in the transparent frame member to efficiently guide light in the display assembly.

* * * * *